United States Patent [19]

Fujiwara

[11] Patent Number: 5,109,734
[45] Date of Patent: May 5, 1992

[54] HYDRAULIC CONTROL SYSTEM FOR AN AUTOMATIC TRANSMISSION

[75] Inventor: Takuji Fujiwara, Hiroshima, Japan

[73] Assignee: Mazda Motor Corporation, Hiroshima, Japan

[21] Appl. No.: 751,067

[22] Filed: Aug. 28, 1991

[30] Foreign Application Priority Data

Aug. 28, 1990 [JP] Japan .................. 2-227810

[51] Int. Cl.$^5$ .................................. F16H 61/18
[52] U.S. Cl. ................................ 74/869; 74/878
[58] Field of Search ........................... 74/878, 869

[56] References Cited

U.S. PATENT DOCUMENTS 4,903,551  2/1990  Hiramatsu et al. ............. 74/878 X

*Primary Examiner*—Dirk Wright
*Attorney, Agent, or Firm*—Fleit, Jacobson, Cohn, Price, Holman & Stern

[57] ABSTRACT

A hydraulic control system for an automatic transmission including a shift gear mechanism having a plurality of frictional elements to be selectively actuated for switching a power transmitting path to establish a desired shift stage, a manual valve for manually selecting a shift range among a plurality of shift ranges providing predetermined shift stages, a 1-2 shift valve for making a shift operation between a first stage and a second stage, a 2-3 shift valve for making a shift operation between the second stage and a third stage, a low stage frictional element for establishing a lower shift stage, a low stage hydraulic circuit for controlling the low stage frictional element by introducing a hydraulic pressure through the manual valve and the 1-2 shift valve, a high stage frictional element for establishing a higher shift stage, a high stage hydraulic circuit for controlling the high stage frictional element by introducing a hydraulic pressure through the manual valve, the 1-2 shift valve and the 2-3 shift valve, the 1-2 shift valve interrupting the introduction of the hydraulic pressure for the low stage hydraulic circuit when the hydraulic pressure is introduced into the high stage hydraulic circuit and introducing the hydraulic pressure to the low stage hydraulic circuit when the introduction of the hydraulic pressure to the high stage hydraulic circuit is interrupted. This enables the engine to prevent an overrun in the low-range. A reliable prevention can be accomplished against the double lock of the high and low stage frictional elements.

7 Claims, 5 Drawing Sheets

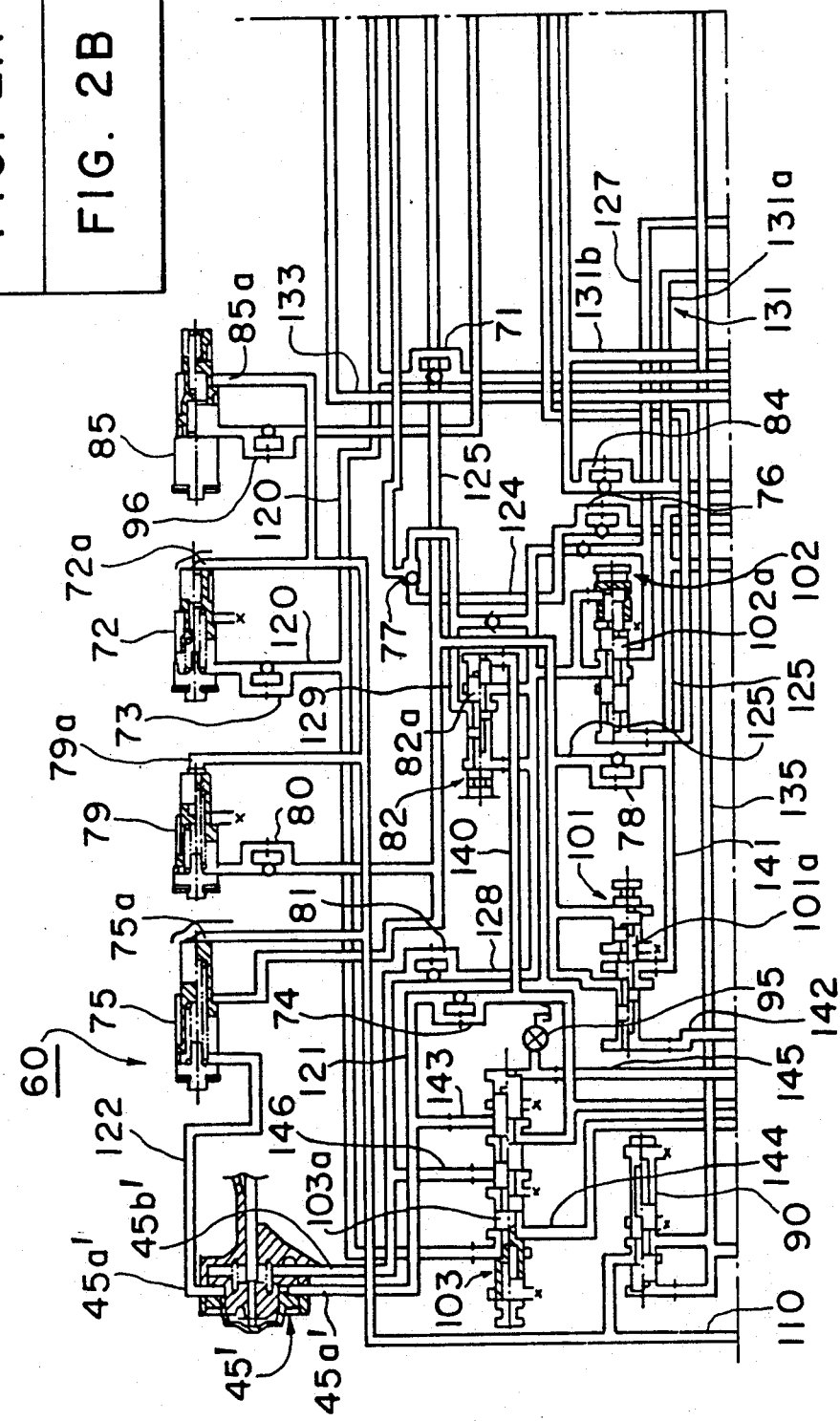

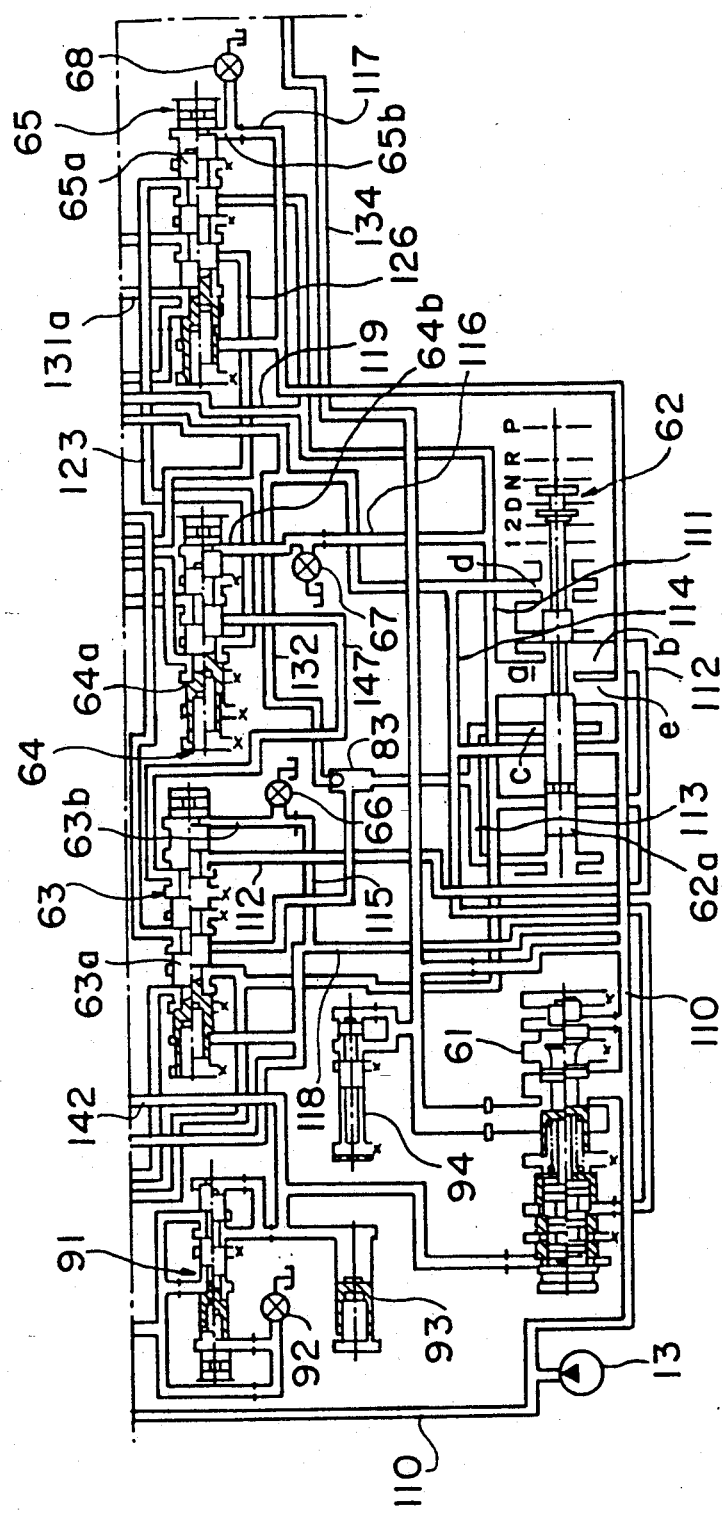

HYDRAULIC CONTROL SYSTEM FOR AN AUTOMATIC TRANSMISSION

BACKGROUND OF THE INVENTION

1. Field of the Invention

The present invention relates to a hydraulic control system for an automatic transmission.

2. Description of the Prior Art

Generally, an automatic transmission for an automotive vehicle is provided with a torque converter and a shift gear mechanism of which a plurality of frictional elements, such as a clutch, brake are selectively actuated to switch a power transmitting path to thereby establish a desired shift stage automatically.

The automatic transmission includes a hydraulic control unit for controlling a hydraulic fluid to and from an actuator of the frictional element. The hydraulic control unit is provided with a regulator valve for adjusting a hydraulic pressure from an oil pump to a line pressure, a manual valve for manually switching a shift range, a plurality of shift valves for selectively actuating the frictional elements, and auxiliary valves actuated in connection with various operations. In recent years, the shift valve has been controlled through a solenoid so as to accomplish a sophisticated shift control in response to a vehicle operating condition.

In such kind of the automatic transmission, as disclosed in Japanese Patent public disclosure (JP A2) No. 63-186055, a low reverse hydraulic circuit for supplying a hydraulic pressure to a low reverse brake is provided independently from a 3-4 clutch hydraulic circuit for supplying a hydraulic pressure to a 3-4 clutch and operates independently from each other so as to prevent a double lock situation in which both the low reverse brake and the 3-4 clutch are engaged concurrently.

However, In such an automatic transmission as aforementioned, it is impossible to engage the 3-4 clutch when a L(low)-range or 1-range is selected in the manual valve that a higher shift stage, for example a third stage cannot be established in the L-range.

SUMMARY OF THE INVENTION

It is therefore an object of the present invention to provide a hydraulic control system for an automatic transmission which can establish a higher shift stage in a low range selected.

It is another object of the present invention to prevent a double lock of a frictional element for a lower shift stage such as the low reverse brake and another frictional element for a higher shift stage such as the 3-4 clutch.

The above and other object of the present invention can be accomplished by a hydraulic control system for an automatic transmission comprising a shift gear mechanism for providing a plurality of shift stages of different speed ratios, a plurality of frictional elements to be selectively actuated for switching a power transmitting path to establish a desired shift stage, a manual valve for manually selecting a shift range among a plurality of shift ranges providing predetermined shift stages, a 1-2 shift valve for making a shift operation between a first stage and a second stage, a 2-3 shift valve for making a shift operation between the second stage and a third stage, a low stage frictional element for establishing a lower shift stage, a low stage hydraulic circuit for controlling the low stage frictional element by introducing a hydraulic pressure through the manual valve and the 1-2 shift valve, a high stage frictional element for establishing a higher shift stage, a high stage hydraulic circuit for controlling the high stage frictional element by introducing a hydraulic pressure through the manual valve, the 1-2 shift valve and the 2-3 shift valve, the 1-2 shift valve interrupting the introduction of the hydraulic pressure for the low stage hydraulic circuit when the hydraulic pressure is introduced into the high stage hydraulic circuit and introducing the hydraulic pressure to the low stage hydraulic circuit when the introduction of the hydraulic pressure to the high stage hydraulic circuit is interrupted.

According to the above feature of the invention, when the 1-2 shift valve is switched to introduce the hydraulic pressure into the low stage hydraulic circuit in the case where the manual valve is operated to select L-range or 1-range, the low stage frictional element such as a low reverse brake is engaged to establish a lower shift stage such as a first stage in the 1-range. When the hydraulic pressure is introduced into the high stage hydraulic circuit by virtue of the switching action of the 1-2 shift valve, the high stage frictional element such as a 3-4 clutch is engage to establish a higher shift stage such as a third stage in the 1-range. This enables the engine to prevent an overrun in the low-range. In this case, the switching action of the hydraulic pressure between the introduction and interruption for the low stage hydraulic circuit corresponds to that between the interruption and introduction for the high stage hydraulic circuit as the shift valve is switched. Therefore, a reliable prevention can be accomplished against the double lock of the high and low stage frictional elements.

Further objects, features and advantages of the present invention will become apparent from the Detailed Description of Preferred Embodiments which follows when read in light of the accompanying Figures.

BRIEF DESCRIPTION OF THE DRAWINGS

FIG. 2A, 2B, and 2C show a hydraulic control circuit incorporated into the automatic transmission of FIG. 1 for controlling a lock-up clutch;

DETAILED DESCRIPTION OF THE PREFERRED EMBODIMENTS

Figure 1:
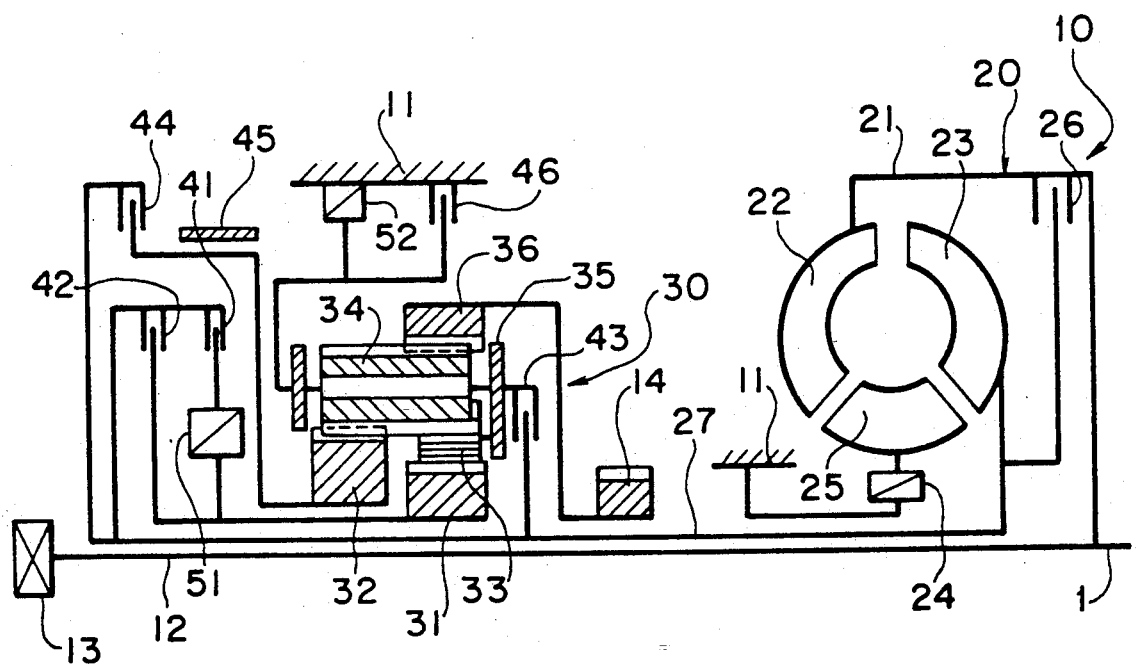
FIG. 1 is a schematic sectional view of an automatic transmission to which a control system in accordance with the present invention can be applied.
Figure 2C:
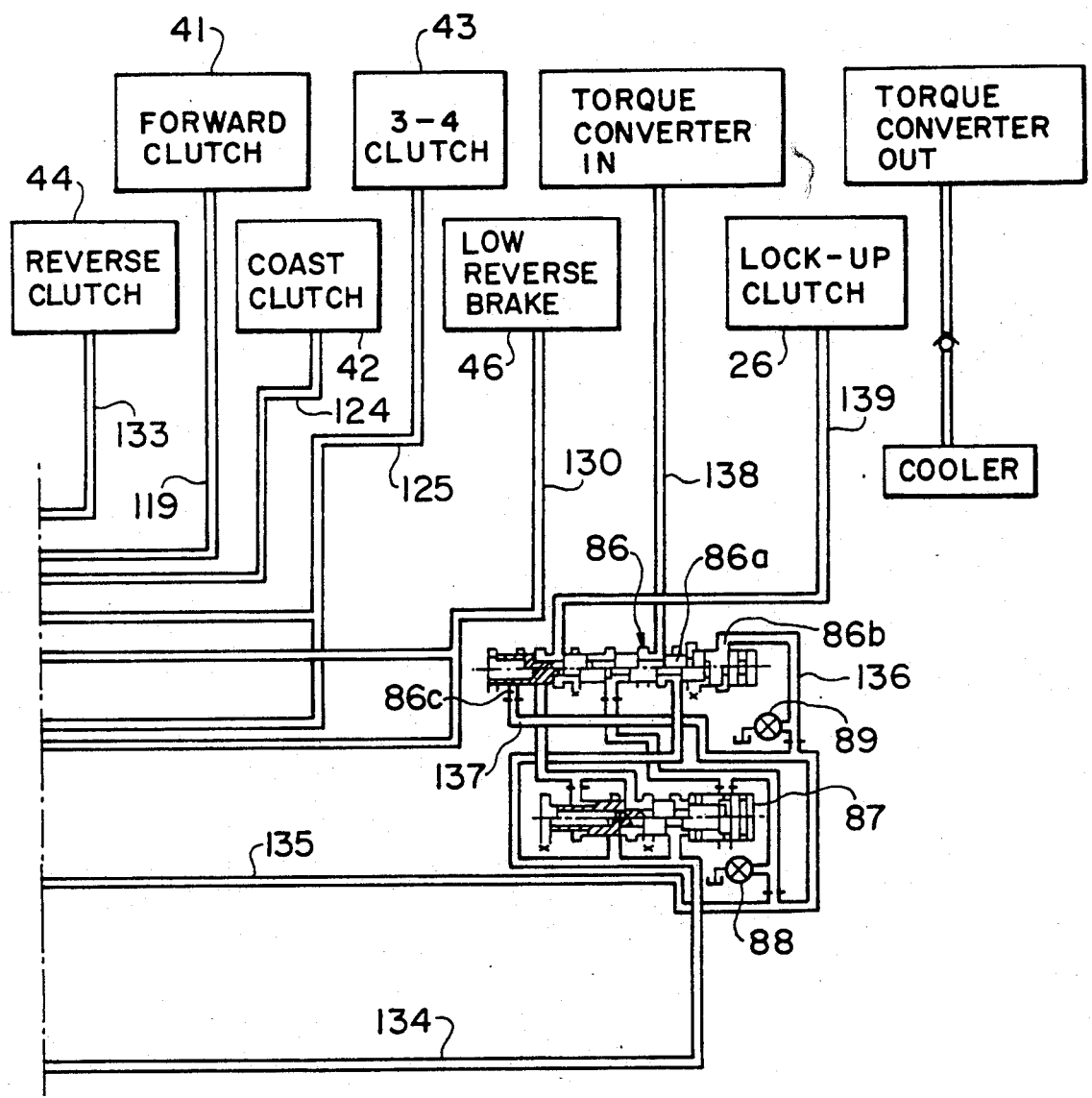

Referring to FIG. 1, an automatic transmission 10 according to the present invention includes a torque converter 20, a shift gear mechanism 30 driven by an output of the torque converter 20, a plurality of frictional elements 46 and one-way clutches 51 and 52 for switching a power transmitting path of the shift gear mechanism 30 to establish one of D, 2, L, R-range when running. In the D-range, 1-4th shift stages are provided. 1-3rd shift stages are provided in the 2-range. 1-3rd shift stages are provided in the L-range.

The torque converter 20 includes a pump 22 provided in a case 21 connected with an engine output shaft 1, a turbine 23 facing the pump 22 to be driven by the pump 22 through a hydraulic fluid, a stator 25 disposed between the pump 22 and the turbine 23 and supported by a transmission case 11 through a one-way clutch 24 and a lock-up clutch 26 disposed between the case 21 and the turbine 23 for directly connecting the engaging output shaft 1 with the turbine 23. The rotation of the turbine 23 is transmitted to the shift gear mechanism 30 through the turbine shaft 27. The engine output shaft 1 is connected with a pump shaft 12 passing through the turbine shaft 27. The pump shaft 12 drives an oil pump 13 provided at a rear end portion of the automatic transmission 10.

The shift gear mechanism 30 of a Ravigneaux-type planetary gear mechanism includes a small sun gear 31 movably mounted on the turbine shaft 27, a large sun gear 32 movably mounted on the turbine shaft 27 rearward of the small sun gear 31, a plurality of short pinion gears 33 meshed with the small sun gear 31, a long pinion gear 34 meshed with the short pinion gear 33 at a front portion and with the large sun gear 32, a carrier 35 for rotatably carrying the long pinion gear 34 and the short pinion gear 33, and a ring gear 36 meshed with a front portion of the long pinion gear 34.

Between the turbine shaft 27 and the small sun gear 31 are disposed a forward clutch 41 and a first one-way clutch 51 in series and a coast clutch 42 in a juxtaposed relationship with the clutches 41 and 51. A 3-4 clutch 43 is disposed between the turbine shaft 27 and the carrier 35. A reverse clutch 44 is disposed between the turbine shaft 27 and the large sun gear 32. Between the large sun gear and the reverse clutch 44 is disposed a 2-4 brake 45 as a band brake fixing the large sun gear 32. Between the carrier 35 and the transmission case 11 are disposed a second one-way clutch 52 for supporting the carrier 35 against a reactive force acting thereto and a low reverse brake 46 for fixing the carrier 35 in a juxtaposed arrangement. The ring gear 36 is connected with the output gear 14 through which a rotation is transmitted to right and left wheels (not shown) through a differential mechanism.

A relationship between operations of the frictional elements and the shift stages obtained has been known so that a detailed explanation is omitted by showing the relationship in Table 1. In the table 1, (0) means that the corresponding element is engaged to transmit the torque. (*) means that the corresponding element races when coasting.

to both of them, the 2-4 brake 45 is disengaged. Actuators of the other frictional elements 41–44, and 46 include usual hydraulic pistons so that they are engaged when the hydraulic pressure is introduced into the actuators.

The hydraulic control circuit 60 is provided with a regulator valve 61 for adjusting a hydraulic pressure from the oil pump 13 to a main line 110 to a line pressure, a manual valve 62 for selecting a range in the D, 2, L and R through manual operation and 1-2, 2-3 and 3-4 shift valves 63, 64 and 65 which control the hydraulic pressure for the actuators of the frictional elements 41–46.

The manual valve 62 is provided with an input port e and a first through fourth output ports a–d. When a spool 62a is moved, the input port e is communicated with the first and second output ports a, b in the D-range and 2-range, with the first and third ports a, c in the L-range and with the fourth port d in the R-range. With the output ports a–d are connected lines 111–114 respectively.

In the 1-2, 2-3, 3-4 shift valves 63, 64 and 65, spools 63a, 64a and 65a are urged rightwardly as illustrated. At right end of the spools 63a, 64a and 65a are provided pilot ports 63b, 64b and 65b respectively. With the pilot port 63b of the 1-2 shift valve 63 is connected a pilot line 115 separated from the main line 110 through a line 118. With the pilot port 64b of the 2-3 shift valve 64 is connected a pilot line 116 separated from the first output line 111. With the pilot port 65b is connected a pilot line 117 communicated with the main line 110. On the pilot lines 115, 116 and 117 are provided 1-2, 2-3 and 3-4 solenoid valves 66, 67 and 68. When the solenoid valve 66–68 are energized or ON, the pilot lines 115, 116 and 117 are drained so that the pilot pressure of the ports 63b–65b are discharged. Thus, the spools 63a–65a are placed at the right position. When the solenoid valves 66–67 are deenergized or OFF, the hydraulic pressure is introduced into the pilot ports 63b–65b through the pilot lines 115, 116 and 117 to place the spools 63a–65a at a left position.

The solenoid valves 66–68 are controlled between ON and OFF based on a map defined by the vehicle

TABLE 1

| RANGE | | CLUTCH | | | BRAKE | | ONE-WAY CLUTCH | |
|---|---|---|---|---|---|---|---|---|
| | FORWARD (41) | COAST (42) | 3-4 (43) | REVERSE (44) | 2-4 (45) | LOW REVERSE (46) | 1st (51) | 2nd (52) |
| P | | | | | | | | |
| R | | | | O | | O | | |
| N | | | | | | | | |
| D 1st | O | | | | | | O* | O* |
| 2nd | O | | | | O | | O* | |
| 3rd | O | O | O | | | | O* | |
| 4th | O | | O | | O | | | |
| 2 1st | O | | | | | | O* | |
| 2nd | O | O | | | O | | O* | |
| 3rd | O | O | O | | | | O* | |
| 1 1st | O | O | | | | O | O* | O* |
| 2nd | O | O | | | O | | O* | |
| 3rd | O | O | O | | | | O* | |

Figure 3:
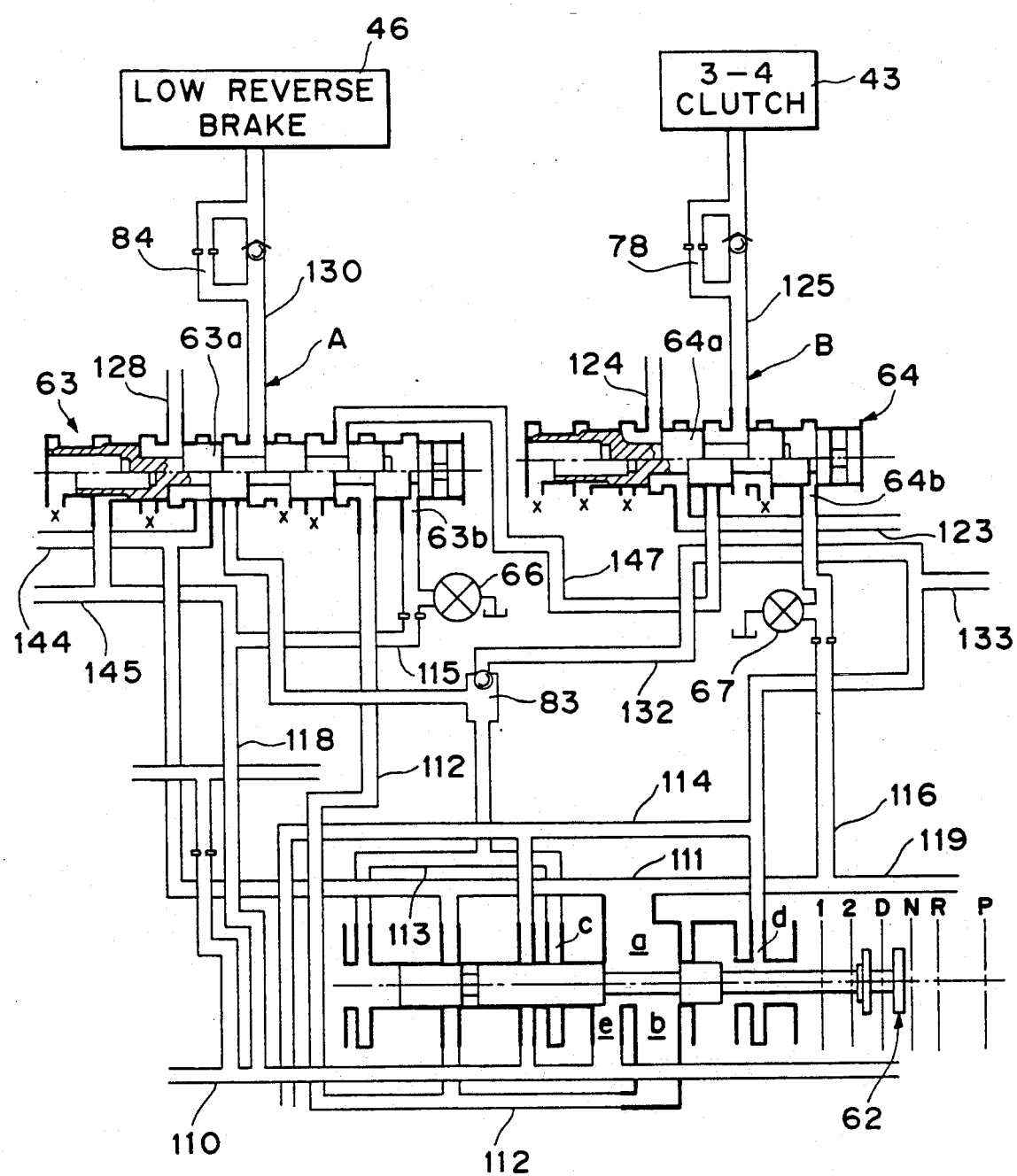
FIG. 3 shows a part of hydraulic control circuit of FIG. 2.

Hereinafter, a hydraulic control circuit 60 is explained taking reference with FIG. 3.

An actuator 45' of the 2-4 brake 45 includes a servo piston having an apply port 45a' and a release port 45b'. When the hydraulic pressure is introduced only into the apply port 45a', the 2-4 brake 45 is engaged. When the hydraulic pressure is supplied to both the port 45a' and the port 45b' or when no hydraulic pressure is supplied speed and throttle communicated with the frictional elements 41–46 through the shift of the spool 63a–65a of the shift valves 63–65. Thus, the frictional element 41–46 are selectively engaged as shown in Table 1 to establish a specific shift stage. In this case, a relationship between the ON and OFF of the solenoid valves 66–68 and the shift stages is shown in Table 2.

TABLE 2

|  | D | | | | | 2 | | | 1 | |
| --- | --- | --- | --- | --- | --- | --- | --- | --- | --- | --- |
|  | 1 | 2 | 2—3 | 3 | 4 | 1 | 2 | 3 | 1 | 2 |
| 1-2 SOLENOID VALVE (66) | OFF | ON | ON | ON | ON | OFF | ON | ON | OFF | ON |
| 2-3 SOLENOID VALVE (67) | ON | ON | ON | OFF | OFF | ON | ON | OFF | ON | ON |
| 3-4 SOLENOID VALVE (68) | ON | ON | OFF | OFF | ON | ON | OFF | OFF | OFF | OFF |

When a down shift is made from the third to second stages, an intermediate stage is established.

A forward clutch line 119 is separated from the first output line 111 connected with the main line 110. The line 119 is connected with a forward clutch 41 through a one-way orifice Thus, in the D, 2 and L-range, the forward clutch 41 is engaged. A N-D accumulator 72 is connected with the forward clutch line 119 through a line 120 for providing a damping effect during the engagement of the forward clutch 41. A numeral 73 designates a one-way orifice.

The first output line 111 is connected with the 1-2 shift valve 63. When the 1-2 solenoid valve 66 is turned ON to move the spool 63a of the 1-2 shift valve 63 rightwardly, the line 111 is communicated with a servo apply line 121 so that the hydraulic pressure is introduced to the apply port 45a' of the servo piston 45' through a one-way orifice 74. Thus, when the 1-2 solenoid valve 66 is ON in D, 2 and L-range, in other words, when the second, third or fourth stages is established in the D-range, when the second or third stages is established in the 2-range and when the second stage is established in the L-range, the hydraulic pressure is introduced into the apply port 45a' as a servo apply pressure. In this case, when the hydraulic pressure is not introduced into the release port 45b' wherein the second or fourth stage in the D-range, the second stage in the 2-range or the second stage in the L-range is established, the 2-4 brake is engaged. A 1-2 accumulator 75 for damping in engaging the 2-4 brake 45 is connected with the apply port 45a' through a line 122.

The first output line 111 is communicated with the 3-4 shift valve 65 and with a line 123 when the 3-4 solenoid valve 68 is OFF and the spool 65a is in the left position. The line 123 is communicated with the 2-3 shift valve 64 and with a coast clutch line 124 when the 2-3 solenoid valve 67 is ON and spool 64a is in the right position. The coast clutch line 124 is communicated with the coast clutch 42 through a one-way orifice 76 and a ball valve 77 for switching the hydraulic passage. Thus, when the 2-3 solenoid valve 67 is ON and the 3-4 solenoid valve 68 is OFF, in other words when the second stage in the 2-range and the first or second stages in the L-range are established, the coast clutch 42 is engaged.

The second output line 112 communicated with the main 110 in the D, 2 and L-ranges is communicated with the 1-2 shift valve 63. When the 1-2 solenoid valve 66 is ON so that the spool 63a is in the right position, the second output line 112 is communicated with a line 147. The line 147 is communicated with the 2-3 shift valve 64 and with a 3-4 clutch line 125 when the 2-3 solenoid valve 67 is OFF so that a spool 64a of the 2-3 shift valve 63 is in the left position. The line 125 is connected with the 3-4 clutch 43 through a one-way orifice 78. Thus, when the 1-2 solenoid valve 66 is ON and the 2-3 solenoid valve 67 is OFF in the D, 2 and 1-range, in other words, when the third or fourth stage in the D-range, the third stage in the 2-range or the third stage in the L-range is established, the 3-4 clutch 43 is engaged. In the illustrated embodiment, the second output line 112 of the manual valve 62, the line 147, the 3-4 clutch line 125 forms a 3-4 clutch circuit as a high stage hydraulic circuit A (see FIG. 3) for introducing a hydraulic pressure into the 3-4 clutch 43 as a high stage frictional element. An accumulator 79 for damping in engaging the 3-4 clutch 43 is connected with the clutch line 125. A numeral 80 is a one-way orifice.

A line 126 separated from the 3-4 clutch line 123 is communicated with the 3-4 shift valve 65 and communicated with a line 127 when the 3-4 solenoid valve 68 is OFF in which the spool 65a is in the left position, and with a servo release line 128 through a 2-3 timing 102. The servo release line 128 is communicated with the release port 45b' of the servo piston 45' through a one-way orifice 81. Thus, when the 1-2 solenoid valve 66 is on and both the 2-3 and 3-4 solenoid valves 67 and 68 are OFF in the D, 2 or L-range, in other words, when the third stage in the D, 2 or L-range, the servo release pressure is introduced into the release port 45b' of the servo piston 45' to release the 2-4 brake 45.

A line 129 separated from the servo release line 128 is communicated with a coast clutch line 124 and with the coast clutch 42 through a coast control valve 82 and the ball valve 77. Thus, when the third stage is established in the D-range, 2-range and L-range in which the hydraulic pressure is introduced into the servo release line 128, the coast clutch 42 is engaged.

The third output line 113 communicated with the main line 110 through the manual valve 62 is communicated with the 1-2 shift valve 63 through a ball valve 83 as a switching valve. The line 113 is communicated with a low reverse brake line 130 when the 1-2 valve 66 is OFF to place the spool 63a at the left position and communicated with the low reverse brake 46 through a one-way orifice 84 for the accumulator. The low reverse brake 46 is engaged when the 1-2 valve 66 is OFF in the L-range or when the first stage is established in the L-range. In the illustrated embodiment, the third output line 113 and the low reverse brake line 130 forms a low reverse hydraulic circuit B (see FIG. 3) as a lower range circuit for introducing the hydraulic pressure into the low reverse brake 46 as a low stage frictional element.

A bypass passage 131 is provided on the low reverse brake line 130. The bypass passage 131 includes a first bypass passage 131a separated from an upstream portion of the line 130 and communicated with the 3-4 shift valve 65, and a second bypass passage 131b extended from the 3-4 shift valve 65 to a downstream portion of the one-way orifice 84. When the 3-4 solenoid valve 68 is OFF to place the spool 65a at the left position, the first and second bypass passage 131a and 131b are communicated with each other.

The low reverse brake line 130 is connected with a N-R accumulator 85 for damping the low reverse brake 46 when the brake 46 is engaged.

The fourth output line 114 communicated with the main line 110 when the manual valve 62 is in the R-range is communicated with the ball valve 83 through a line 132 separated from the line 114. Further, the fourth output line 114 is communicated with the reverse clutch through a reverse clutch line 133. Thus, in the R-range, only when the 1-2 solenoid 66 is OFF, the low reverse brake 46 is engaged. The reverse clutch 44 is kept engaged in the R-range.

The hydraulic control unit 60 is also provided with a lock-up shift valve 86 for actuating the lock-up clutch 26 of the torque converter 20 shown in FIG. 1 and a lock-up control valve 87 for adjusting the hydraulic pressure introduced into the torque converter 20. Numerals 88 and 89 designate a duty solenoid valve and a lock-up solenoid valve respectively.

The lock-up shift valve 86 is connected with the regulator valve 61 through a torque converter line 134. A first and second pilot ports 86b and 86c provided at opposite ends of the valve 86 are communicated with lines 136 and 137 separated from a pilot line 135 which is separated from the main line 110 and provided with a reducing valve 90. The lock-up solenoid valve 89 is provided on the line 136. When the lock-up solenoid valve 89 is ON to place the spool 86a of the lock-up shift valve 86 at the right position, the torque converter line 134 is communicated with a torque converter line 138 and with the inside of the torque converter 20 so that the hydraulic pressure in the torque converter 20 is increased to engage the lock-up clutch 26. When the lock-up solenoid valve 89 is OFF to move the spool 86a of the valve 86 leftward, the converter line 134 is communicated with a lock-up release line 139 so that a lock-up release pressure is introduced into the torque converter 20 to release the lock-up clutch 26. Numeral 94 designates a converter release valve.

In addition, the hydraulic control circuit 60 is provided with a bypass valve 101 and a 3-2 timing valve 103 in addition to the coast timing valve 82 and the 2-3 timing valve 102.

The coast timing valve 82 is disposed on a line 129 separated from the line 128 and communicated the coast clutch line 124 through the ball valve 77. The servo apply pressure is introduced to one end of the spool 82a through a line 140 separated from the servo apply line 121. When the servo release pressure introduced into the other end of the spool 82a through the line 129 added to a spring force is increased beyond the servo apply pressure, the line 129 is opened. Therefore, when a shift up operation from the second to the third stages (a 2-3 shift-up operation ) is made in the D or 2 range, the coast clutch 42 is engaged after the servo release pressure is increased enough to release the 2-4 brake 45. As a result, a double lock condition can be avoided that both the 2-4 brake 45 and the coast clutch 42 are engaged concurrently. In this case, the servo apply pressure is introduced into one end of the spool 82a of the coast timing valve 82 so that the communication timing of the line 129 is changed in accordance with the servo apply pressure. As a result, a relationship between the communication timing and the pressure level of the servo release can be maintained appropriately.

The one-way valve 101 is provided on a bypass line 141 which bypasses the one-way orifice 78 provided on the 3-4 clutch line 125. A spool 101a of the valve 101 is subjected to a 3-4 clutch pressure produced at downstream of the oneway orifice 78 at one end, and subjected to a throttle modulator pressure adjusted by a regulator valve 91 to a pressure corresponding to the engine load at the other end through a line 142. When the 3-4 clutch pressure is increased beyond a predetermined value to move the spool 101a to the left position, the bypass line 141 is interrupted. At the beginning, the 3-4 clutch pressure is increased quickly by the hydraulic pressure introduced through the bypass line 141. Thereafter, the 3-4 clutch pressure is increased gradually by means of the one-way orifice 78. As a result, the engaging timing of the 3-4 clutch 43 can be controlled in the 2-3 shift up operation. Numerals 92 and 93 designates a duty solenoid valve and an accumulator.

The 2-3 timing valve 102 is provided between the servo release line 128 and a line 127 communicated with the 3-4 shift valve 65. A spool 102a of the valve 102 is subjected to the 3-4 clutch pressure at one end and to the servo release pressure at the other end. The valve 102 communicates the servo release line 128 with the line 127 and drains the line 128 in accordance with the servo release pressure so that the servo pressure is controlled in response to the 3-4 clutch pressure.

The 3-2 timing valve 103 is provided between a first bypass line 143 bypassing the one-way orifice 74 on the servo apply line 121 and a second bypass line 144 bypassing the one-way orifice 71 on the forward clutch line 119. The valve 103 is communicated with a pilot line 145 separated from a line 118 communicated with the main line 110 at one end portion of a spool 103a, communicated with a drain line 146 separated from the servo release line 128 at an intermediate portion of the spool 103a. The pilot line 145 is provided with a 3-2 solenoid valve 95. The timing valve 103 opens and closes the first and second bypass lines 143 and 144 in accordance with the 3-2 solenoid valve 95 in a 1-2 shift up operation (shift up operation from the first stage to the second stage), the 3-2 shift down operation and a 4-2 shift down operation (shift down operation from the fourth stage to the second stage) so as to control hydraulic supply timing. In detail, the valve 103 is operated to communicate the first bypass line 143 so as to provide the apply port 45a' with the servo apply pressure increasing rapidly in an initial stage of the 1-2 shift up operation. After a certain time period from the start of the shift operation, the first bypass line 143 is interrupted so that the servo apply pressure increasing gradually is introduced into the apply port 45a' of the servo piston 45' through the one-way orifice 74. In the 3-2 shift down operation, the valve 103 communicates the drain line 146 with a drain port and thereafter interrupts the drain line 146. As a result, the servo release pressure is decreased quickly at initial stage of the shift operation through the drain line 146 and decreased gradually at final stage of the shift operation through the one-way orifice 81 which reduces a flow area of the servo release line 128. In the 4-2 shift down operation, the valve 103 opens the second bypass line 144 at initial stage so that the forward clutch pressure increasing rapidly is introduced into the forward clutch 41. At final stage of the shift operation, the second bypass line 144 is closed so that the forward clutch pressure increasing gradually by virtue of the one-way orifice is introduced into the forward clutch 41. The main line 110 is communicated with a back pressure ports 72a, 75a, 79a and 85a of the accumulators 72, 75, 79 and 85 to provide them with the hydraulic pressure. The main line 110 is provided with the regulator valve 91 connected with the reducing valve 90 and the duty solenoid valve 92. The duty solenoid valve 92 which is controlled by a ON-OFF signal is actuated to drain the main line 110 when it is ON so that the back pressure acting on the accumulators 72, 75, 79 and 85 is reduced. Thus, the back pressure provided by the main line 110 is controlled by a duty ratio (ratio of a valve opening time in one cycle) of the duty solenoid valve 92.

the low reverse hydraulic circuit A and the 3-4 clutch hydraulic circuit B in the hydraulic circuit 60 controls the engagement of the low reverse brake 46 and the 3-4 clutch 43 by means of the switching action of the shift valve 63 and 2-4 shift valve 64. Through this control, the third stage can be established in the L-range. It should be however noted that the low reverse hydraulic circuit A is opened to engage the low reverse brake 46 when the 3-4 clutch hydraulic circuit B is closed to disengage the 3-4 clutch 43 and vice versa in response to the switching action of the 1-2 shift valve 63. Therefore, the double lock can be avoided that the low reverse brake 46 and the 3-4 clutch 43 are engaged concurrently.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. A hydraulic control system for an automatic transmission comprising
   a shift gear mechanism having a plurality of frictional, elements to be selectively actuated for switching a power transmitting path to establish a desired shift stage,
   a manual valve for manually selecting a shift range among a plurality of shift ranges providing predetermined shift stages of the shift gear mechanism,
   a 1-2 shift valve for making a shift operation between a first stage and a second stage of the shift gear mechanism,
   a 2-3 shift valve for making a shift operation between the second stage and a third stage of the shift gear mechanism,
   a low stage frictional element for establishing a lower shift stage of the shift gear mechanism,
   a low stage hydraulic circuit for controlling the low stage frictional element by introducing a hydraulic pressure through the manual valve and the 1-2 shift valve,
   a high stage frictional element for establishing a higher shift stage of the shift gear mechanism,
   a high stage hydraulic circuit for controlling the high stage frictional element by introducing a hydraulic pressure through the manual valve, the 1-2 shift valve and the 2-3 shift valve,
   the 1-2 shift valve interrupting the introduction of the hydraulic pressure for the low stage hydraulic circuit when the hydraulic pressure is introduced into the high stage hydraulic circuit and introducing the hydraulic pressure to the low stage hydraulic circuit when the introduction of the hydraulic pressure to the high stage hydraulic circuit is interrupted.

2. A hydraulic control system as recited in claim 1 wherein the low stage frictional element is a low reverse brake.

3. A hydraulic control system as recited in claim 1 wherein the high stage frictional element is a 3-4 clutch.

4. A hydraulic control system as recited in claim 1 wherein the lower shift stage is the first stage.

5. A hydraulic control system as recited in claim 1 wherein the higher shift stage is the third stage.

6. A hydraulic control system as recited in claim 1 wherein the lower shift stage is established in a L-range when the 1-2 shift valve is actuated to engage the low stage frictional element.

7. A hydraulic control system as recited in claim 1 wherein the higher shift stage is established in a L-range when the 1-2 shift valve is actuated to engage the high stage frictional element.

* * * * *